United States Patent [19]

Essers

[11] 4,087,671
[45] May 2, 1978

[54] DEVICE FOR PLASMA-MIG WELDING

[75] Inventor: Wilhelmus Gerardus Essers, Eindhoven, Netherlands

[73] Assignee: U.S. Philips Corporation, New York, N.Y.

[21] Appl. No.: 662,452

[22] Filed: Mar. 1, 1976

[30] Foreign Application Priority Data

Mar. 19, 1975  Netherlands .......................... 7503241

[51] Int. Cl.² .............................................. B23K 9/00
[52] U.S. Cl. ............................ 219/121 P; 219/137 PS; 219/74
[58] Field of Search ............. 219/121 P, 121 EB, 137, 219/74, 75

[56] References Cited

U.S. PATENT DOCUMENTS

| 3,783,229 | 1/1974 | Rohe et al. | 219/121 P |
| 3,832,513 | 8/1974 | Klasson | 219/121 P X |
| 3,891,824 | 6/1975 | Essers | 219/121 P X |
| 3,898,418 | 8/1975 | Husui | 219/121 P |
| 3,997,756 | 12/1976 | Bykhovsky | 219/121 P |

FOREIGN PATENT DOCUMENTS

| 2,062,036 | 9/1971 | Germany | 219/121 P |
| 1,910,398 | 11/1969 | Germany | 219/121 P |

OTHER PUBLICATIONS

Welding Technology Data – Sheet 46, Welding and Metal Fabrication – Dec. 1974.

Primary Examiner—J. V. Truhe
Assistant Examiner—M. Paschall
Attorney, Agent, or Firm—Frank R. Trifari; Rolf E. Schneider

[57] ABSTRACT

A device for plasma-MIG welding comprising a welding torch provided with a non-consumable electrode and a supply of a welding wire, the non-consumable electrode being connected to a first power supply source having a drooping voltage characteristic and the welding wire being connected to a second power supply source having a constant voltage characteristic, the first power supply source being connected in series with the second power supply source, thereby improving the stability of the plasma arc.

4 Claims, 4 Drawing Figures

DEVICE FOR PLASMA-MIG WELDING

This invention relates to a device for plasma-MIG welding, comprising a welding torch having a housing which is provided with a nozzle, a non-consumable electrode, a contact tube for the supply of a welding wire, and means for the supply of a plasma gas, the said device furthermore comprising a first power supply source having a drooping voltage characteristic and a second power supply source having a constant voltage characteristic, the non-consumable electrode being connected to the first power supply source, and the contact tube being connected to the second power supply source.

In a device of this kind which is known from U.S. Pat. No. 3,612,807, the two power supply sources are independent from each other and separate; a welding wire is axially fed through the nozzle via the contact tube, and a MIG-arc is maintained between the welding wire and a workpiece in a thermally ionized gas, referred to hereinafter as plasma, which is generated by maintaining a plasma arc in a gas flow between the non-consumable electrode and the workpiece. The plasma arc is not influenced by the power supply source for the MIG arc. In this manner a high deposition rate of the welding wire is obtained, together with proper wetting of the weld and a comparatively small penetration of the workpiece.

Furthermore, U.S. Pat. No. 3,891,824 describes a device of the kind set forth in which the contact tube and the non-consumable electrode are connected to the positive poles of the two power supply sources; at a low current intensity in the welding wire, a cylindrical MIG arc with a concentrated material transfer is then obtained; a high current intensity in the welding wire causes rotation of the MIG arc and a spread material transfer.

It has been found in practice that during welding using these known devices, the plasma arc can be extinguished under adverse conditions, for example, in the case of an excessive arc length.

The present invention has for its object to mitigate these drawbacks and to enhance the stability of the plasma arc. This object is achieved according to the invention in that the first power supply source is connected in series with the second power supply source.

As a result, a combined current-voltage characteristic is obtained for the non-consumable electrode, which is an addition of the individual characteristics of the two power supply sources; the open-circuit voltage of the non-consumable electrode with respect to the workpiece then equals the sum of the open-circuit voltage of the first power supply source and the voltage on the welding wire. The part of the combined characteristic on which the working point of the plasma arc is situated at a given voltage is steeper than the corresponding part of the individual characteristic of the first power supply source at the same voltage.

The desired ideal characteristic for the power supply of the non-consumable electrode can also be obtained by means of a special power supply source. However, it is one of the advantages of the invention that the desired object is achieved simply by a suitable connection of two conventional power supply sources.

In a preferred embodiment of the device according to the invention, the contact tube is arranged coaxially and the non-consumable electrode is arranged eccentrically with respect to the centre line of the housing in a manner known per se. The welding wire is centrally passed through the plasma opening in the nozzle. The nozzle can be constructed such that a constricting effect is exerted on the plasma, the welding wire being axially fed into the arc plasma.

The plasma opening in the nozzle can also be proportioned such that the nozzle has only a guiding function. When the MIG arc is struck, the plasma is drawn around the welding wire due to the Lorentz effect, a constricting effect then also being obtained.

The contact tube need not be centrally arranged in the housing. A further preferred embodiment of the device according to the invention is characterized in that the contact tube and the non-consumable electrode are arranged one on each side of the centre line of the housing. Using this step, a welding torch having comparatively small transverse dimensions is obtained.

In a further preferred embodiment of the device according to the invention, the nozzle is constructed as the non-consumable electrode. In this embodiment the contact tube is arranged on the centre line of the housing. Because a separate non-consumable electrode in the housing is not required, this embodiment also enables the construction of a welding torch involving small transverse dimensions.

The invention will be described in detail hereinafter with reference to the drawings, in which.

Figure 1:
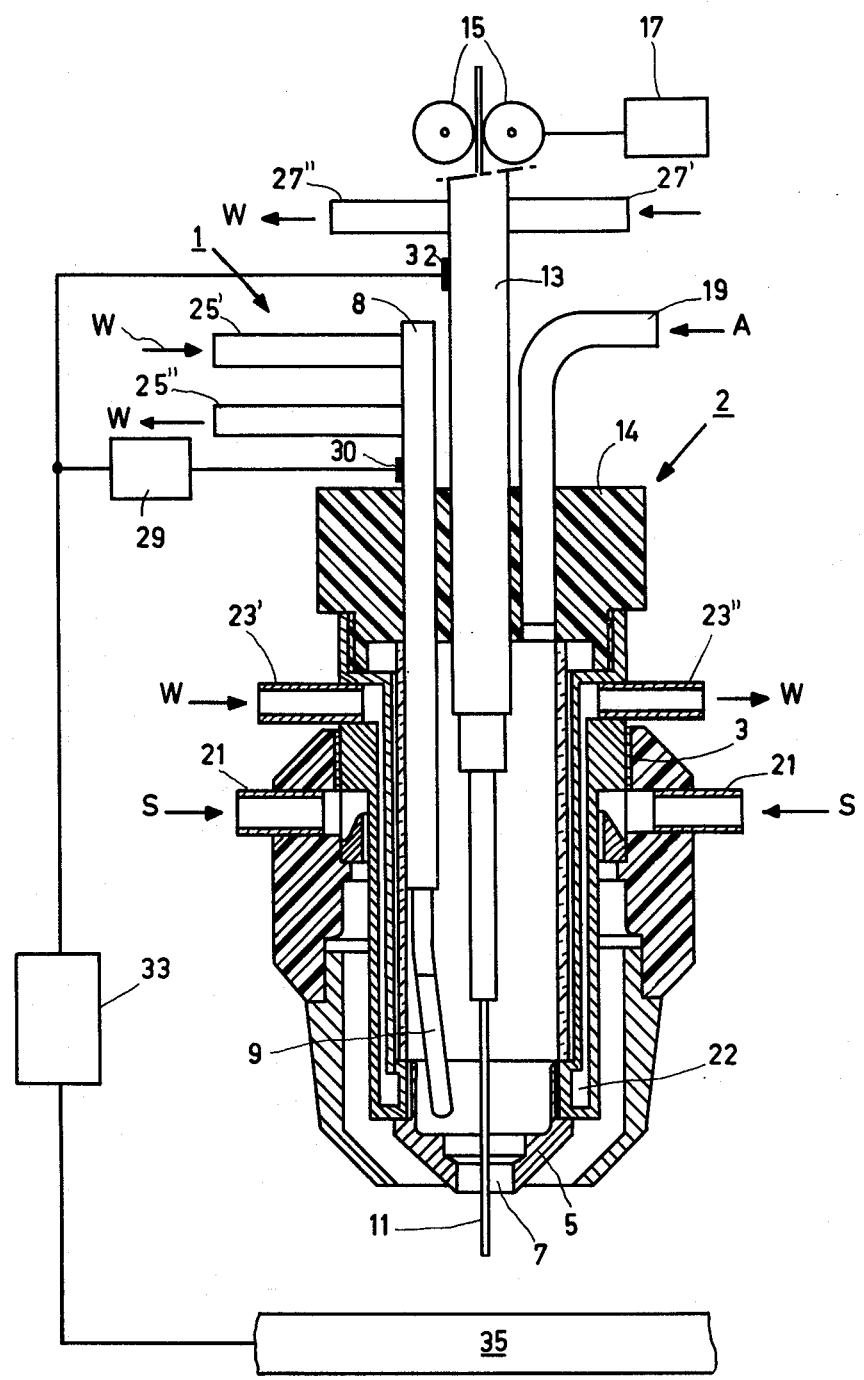
FIG. 1 shows an embodiment of the device according to the invention.

The device 1 shown in FIG. 1 comprises a welding torch 2 including a housing 3 provided with a nozzle 5 having a plasma opening 7. In the housing 3 an electrode holder 8 with a non-consumable electrode 9, for example of tungsten, is eccentrically arranged with respect to the plasma opening 7. A welding wire 11 is axially passed through the centre of the plasma opening 7 by way of a contact tube 13 which is centrally arranged in the housing. The electrode holder 8 and the contact tube 13 are secured in a cover 14 of insulating material. The transport of the welding wire 11 is effected by means of transport rollers 15 which are driven at a variable speed by a motor 17. The welding torch 2 is furthermore provided with a supply duct 19 for the supply of a plasma gas A, for example, argon. A protective gas S, for example, a mixture of argon and carbonic acid gas, can be supplied via connections 21. The housing 3, the electrode holder 8 and the contact tube 13 are provided with cooling ducts, only the cooling duct 22 of the housing being shown in the drawing. These cooling ducts communicate with connections 23' and 23", 25' and 25", 27' and 27" for the supply and discharge of cooling water W. Via a connection terminal 30 on the electrode holder 8, the electrode 9 is connected to one of the poles of a first power supply source 29 having a drooping voltage characteristic. The welding wire 11 is connected, by way of a connection terminal 32 on the contact tube 13, to one of the poles of a second power supply source 33, having a constant voltage characteristic. The other pole of the power supply source 33 is connected to a workpiece 35. The electrode 9 and the welding wire 11 have the same polarity.

According to the invention, the power supply source 29 for the plasma arc is connected in series with the power supply source 33 for the MIG arc.

Figure 2:
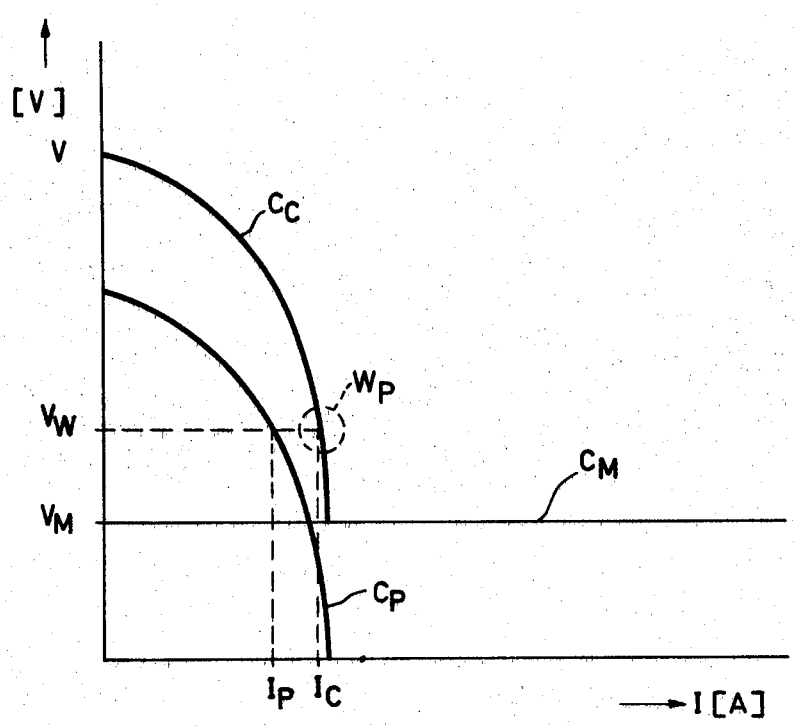
FIG. 2 shows the characteristics of the power supply sources.

The effect of this feature will be described with reference to the diagram shown in FIG. 2; the line $C_M$ represents the constant voltage characteristic of the power supply source 33 for the MIG arc. Curve $C_P$ represents the drooping voltage characteristic of the power supply source 29 for the plasma arc. Because the power supply source 29 for the plasma arc is connected in series with the power supply source 33 for the MIG arc in accordance with the invention, a combined current voltage characteristic curve $C_c$ is obtained for the plasma arc, the said characteristic being an addition of the two individual characteristics $C_M$ and $C_P$. The open-circuit voltage of this combined characteristic equals the sum of the open-circuit voltage of the power supply source for the plasma arc and the voltage on the welding wire. The combined characteristic $C_c$ at the working point $W_P$ is steeper than the characteristic $C_P$ at the same plasma voltage $V_W$. The stability of the plasma arc is thus improved.

This circuit offers a further advantage in that the current intensity $I_P$ of the plasma arc is lower in the absence of the wire voltage $V_M$ than the current intensity $I_c$ of the plasma arc in the presence of the wire voltage $V_M$. As a result, the plasma arc can be directly struck with the desired setting; by the subsequent striking of the MIG arc, the current intensity of the plasma arc is automatically increased without it being necessary to change the setting of the plasma arc. In the known circuit, where the two power supply sources are independent of each other, the plasma arc first must be struck with a comparatively low current intensity in order to avoid overloading of the non-consumable electrode; the plasma arc can then be adjusted to the desired higher current intensity only after the MIG arc has been struck.

For welding using the desired device, the electrode 9, the contact tube 13 and the workpiece 35 are connected to the power supply sources 29 and 33 in the described manner. A plasma gas A is supplied via the supply duct 19 and a protective gas S is supplied via the connections 21. The welding wire 11 is driven by means of the transport rollers 15 and is guided through the centre of the plasma opening 7 by means of the contact tube 13.

A MIG arc is struck between the welding wire 11 and the workpiece 35. A plasma arc is struck between the tungsten electrode 9 and the workpiece 35, the plasma gas flowing through the plasma opening 7 being ionized thereby.

Thanks to the improved stability of the plasma arc obtained according to the invention, the risk of extinguishing the plasma arc under unfavourable conditions is reduced; should the plasma arc extinguish after all, it can be readily struck again because for the described connection of the two power supply sources a voltage is present between the non-consumable electrode and the welding wire.

Figure 3:
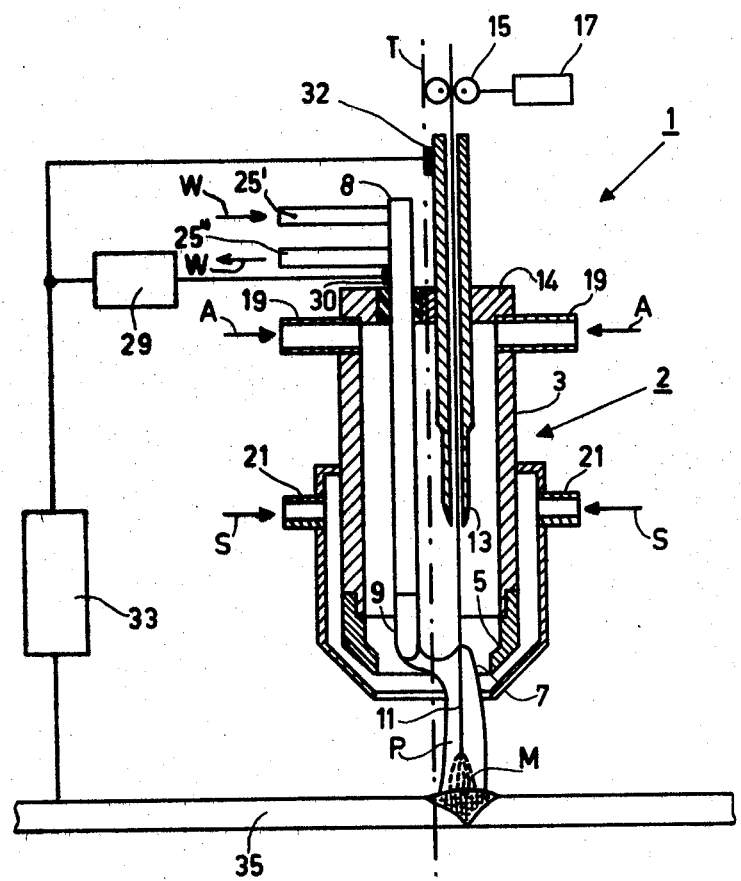
FIGS. 3 and 4 show further embodiments of the device according to the invention.
Figure 4:
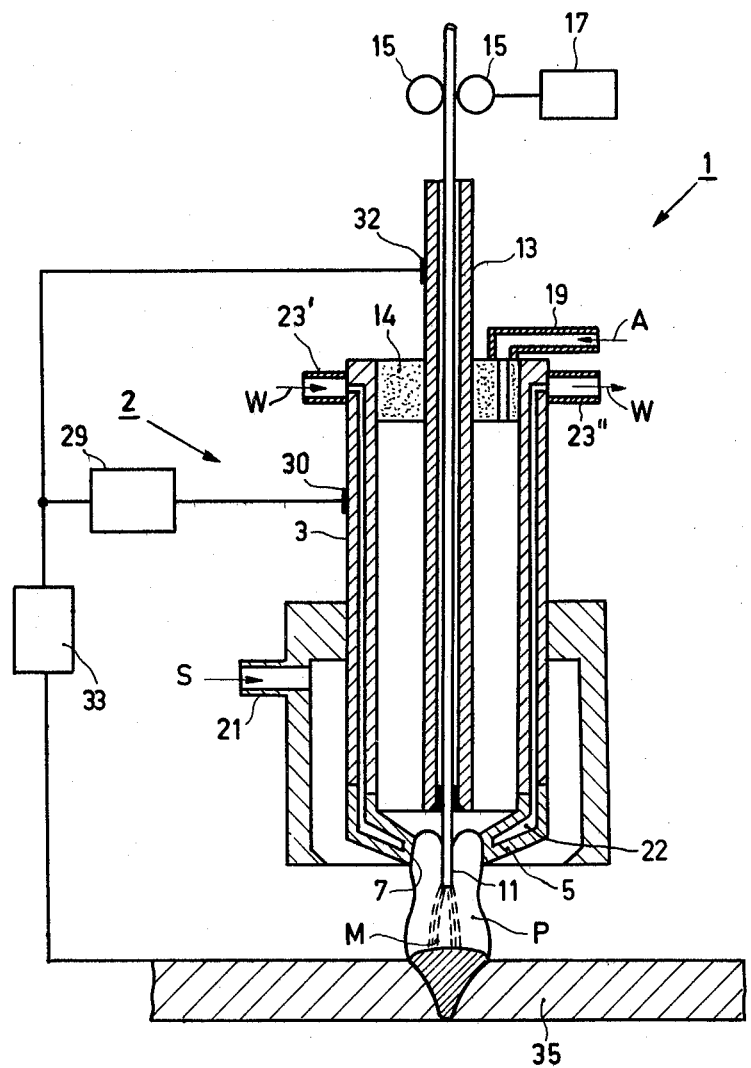

FIGS. 3 and 4 show further preferred embodiments of the device according to the invention, elements corresponding to FIG. 1 being denoted by the same references.

In the device shown in FIG. 3, not only is the electrode holder 8 with the electrode 9 eccentrically arranged with respect to the centre line T of the housing 3 and of the plasma opening 7, but so is the contact tube 13. The plasma opening 7 is proportioned such that the plasma P is not constricted by the nozzle 5. When the welding wire 11 is not carrying a current, the plasma P follows the shortest path from the electrode 9 to the workpiece 35, the welding wire than passing along the plasma. As soon as the MIG arc M is struck, the plasma P is drawn around the welding wire 11 due to the Lorentz effect; as in the device according to FIG. 1, the welding wire is subsequently axially fed into the gas plasma so as to be melted.

FIG. 4 shows an embodiment in which the contact tube 13 is again coaxially arranged in the housing 3. A separate non-consumable electrode arranged in the housing can then be dispensed with, because the nozzle 5 acts as the non-consumable electrode and is connected, via the connection contact 30 on the housing 3, to the current source 29. The plasma arc P between the nozzle 5 and the workpiece 35 can be struck spontaneously by the MIG arc M, which is generated by bringing the current-carrying welding wire 11 in contact with the workpiece 35. In this embodiment the welding wire 11 is again axially introduced into the plasma P so as to be melted. The nozzle 5 which acts as the non-consumable electrode can be made of tungsten or of water-cooled copper.

In the device according to the invention, the power supply sources are constructed as direct current sources, the non-consumable electrode and the contact tube having the same polarity; the advantages of the invention become particularly evident in the case of positive polarity of the non-consumable electrode and of the welding wire.

What is claimed is:

1. A device for plasma-MIG welding, which comprises a welding torch including a housing provided with a nozzle to be positioned relative to a workpiece to be welded but out of contact therewith, a non-consumable electrode arranged within the housing out of contact with the workpiece, a contact tube arranged within the housing for supplying a welding wire through the nozzle toward the workpiece but out of contact therewith, means for supplying a plasma gas to the housing and through the nozzle, a first power supply source having a drooping voltage characteristic and connected to the non-consumable electrode, and a second power supply source having a constant voltage characteristic and connected to the contact tube with its associated welding wire for solely maintaining a MIG arc between the welding wire and the workpiece, the first power supply source being connected in series with the second power supply source at a point between such second power supply source and its connection to the contact tube with its associated welding wire for maintaining a plasma arc between the non-consumable electrode and the workpiece.

2. A device according to claim 1, in which the contact tube with its associated welding wire is arranged coaxially and the non-consumable electrode is arranged eccentrically with respect to the centre line of the housing.

3. A device according to claim 1, in which the contact tube with its associated wire and the non-consumable electrode are arranged one on each side of the centre line of the housing.

4. A device according to claim 1, in which the non-consumable electrode is constituted by the nozzle.

* * * * *